UNITED STATES PATENT OFFICE.

MARY P. LANZA, OF BOSTON, MASSACHUSETTS.

PLASTIC COMPOSITION.

No. 861,294.      Specification of Letters Patent.      Patented July 30, 1907.

Application filed May 5, 1906. Serial No. 315,354.

*To all whom it may concern:*

Be it known that I, MARY P. LANZA, a citizen of the United States, and a resident of Boston, in the county of Suffolk and State of Massachusetts, have invented new and useful Improvements in Plastic Composition, of which the following is a specification.

My invention relates to plastic materials and modes of compounding them, and consists of a new and useful plastic compound suitable for modeling purposes, which secures all the advantages peculiar to the responsive media heretofore employed in the art of plastic modeling while eliminating the disadvantages incident to their use.

A plastic composition, in order to serve the uses and meet the requirements of the artist, must be strongly and uniformly cohesive, but at the same time must not be adhesive so as to stick to the fingers or tools of the worker; it must be smooth and homogeneous, and not granular, nor must it be composed in whole or in part of substances which decompose and become rancid. Furthermore the perfect plastic composition must be such as to retain the shape and surface texture given to it by the artist, must not harden or crack after exposure to the air, nor become too soft after handling. Moreover it must be thoroughly plastic, as its name implies, responding readily to every touch, and requiring no especial care in use, or protection from the atmosphere, or in any other way distracting the attention of the artist from his work to his medium. It must be also clean to handle. As plastic compositions are invariably worked with the bare hands, and are used to a large extent in schools for modeling and kindergarten work, it is indispensable that they should be wholly harmless to touch, as well as to taste; therefore no poisonous or deleterious preservative may be safely employed. It is apparent, therefore, that the selection and construction of a fully acceptable plastic composition is a matter of no small difficulty; all kinds of compromises have been made with the many requirements imposed upon the plastic material, but so far as I am informed, with no more than partial success. Today, the best available material is modeling clay, mixed with water; but even this medium of expression is not without its faults and disadvantages. It dries, cracks, falls apart, and requires the frequent addition of water which spoils the surface and involves the repetition of much work, besides demanding constant attention and being "messy" to handle.

My invention in its simplest embodiment, consists of a mixture of clay, or any aluminous or alumino silicious or silicious earth, or earthy material having the physical characteristics of clay, with petroleum jelly. Petroleum jelly appears under different names, (vaseline, petrolatum, keroline, and others). Vaseline and petrolatum are the most common commercial names of the article which I have found to be best adapted for my purpose. These two ingredients, clay or clayey earth and vaseline, are mixed intimately in proportions (by weight) which vary from two parts vaseline with five parts earth, to two parts vaseline with seven parts earth. I do not restrict the composition to these limits, but prescribe them as those within which I have obtained the best results. Some variations in proportion will be found advisable to meet the conditions imposed by the materials employed, the general rule to be observed being, that the larger the proportion of vaseline or analogous plastic binder, the softer will the resulting plastic composition become. The earth employed should be ground fine, at least fine enough to pass through a 100 mesh screen, and it is frequently preferable that it should be sufficiently fine to pass through a 200 mesh one. Earths of desired colors may be mixed with the clay, or if of the proper physical consistency, texture, or "feel" may be used alone with the petroleum jelly or analogous plastic binder. I have used kaolin with good results. Sometimes an earth otherwise desirable possesses a tendency to be adhesive in which case I have found it best to add a little filling material, such as sulfur. The function of the filling material is a mechanical one; the filler serves to separate the stickier particles of the mass and prevents them from unduly adhering to the fingers or the tools of the worker. When an unusually smooth grade is required (although this composition is naturally smoother than the compositions already on the market) I have added a small quantity of some one of the various non-corrodible waxes, such as paraffin, ozocerite, etc. When a high degree of toughness is required, the mixture may be improved in this direction by the addition of a stronger binding material or toughener, such as bauxite or asphaltum, in quantities regulated to suit the degree of toughness or "length" required. (A composition of this class is "long" or "short", according to the degree it can be drawn out without breaking).

The composition thus prepared is strongly cohesive, yet not adhesive, does not decompose or become rancid, is never offensive to the sense of smell, is not materially affected by changes in atmospheric temperature, does not harden and crack, does not become unmanageably soft by handling, and may be kept in readiness for use for any length of time. As it contains no poisonous or injurious substances, it may be always handled with impunity. While responding to the touch as no other known modeling composition except clay mixed with water, it is superior to this for several reasons, among others because the mineral plastic binder is beneficial rather than irritant to the skin of the worker, and prevents rather than produces the chapped hands with which modelers in clay are so often afflicted.

What I claim, and desire to protect by Letters Patent is:

1. A plastic composition, consisting of pulverized earthy matter, and a mineral plastic binder, in intimate mixture.

2. A plastic composition, consisting of pulverized earthy matter, and petroleum jelly, in intimate mixture.

3. A plastic composition, consisting of clay and vaseline in intimate mixture.

4. A plastic composition consisting of clay, a mineral plastic binder and a toughener of tenacious material all in intimate mixture.

5. A plastic composition, consisting of pulverized clay, vaseline, and asphaltum.

6. A plastic composition, consisting of pulverized earthy matter, petroleum jelly, and a filler.

7. A plastic composition, consisting of pulverized earthy matter, a mineral plastic binder, and a wax.

Signed by me at Boston, Suffolk county, Massachusetts, this third day of May, 1906.

MARY P. LANZA.

Witnesses:
C. D. WOODBERRY,
JOSEPHINE H. RYAN.